Aug. 14, 1956 T. R. BAXTER ET AL 2,758,522
APPARATUS FOR FABRICATING DRUM LINERS
Filed Dec. 31, 1952 2 Sheets-Sheet 2
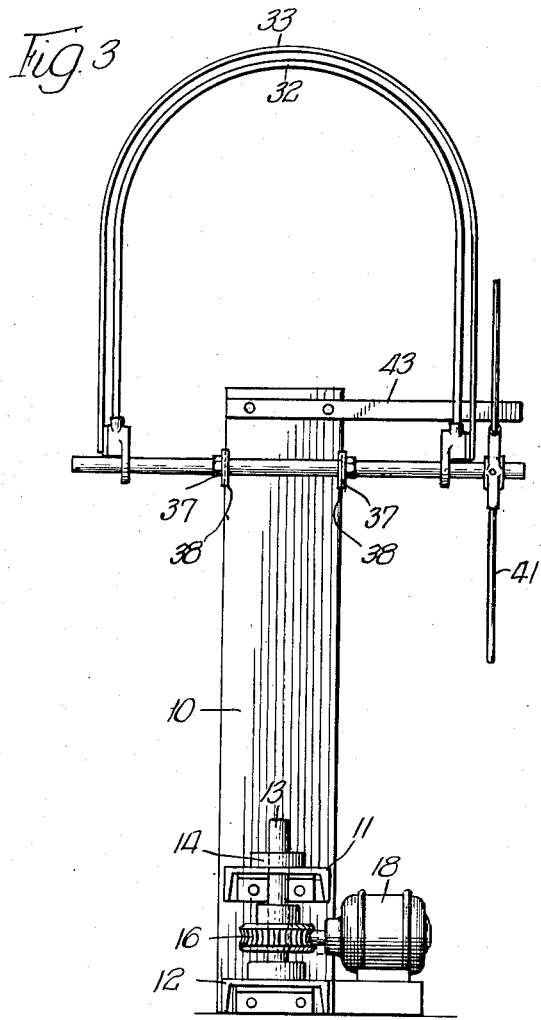
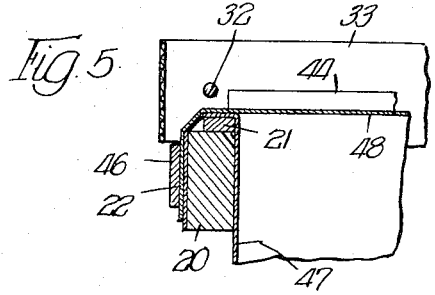
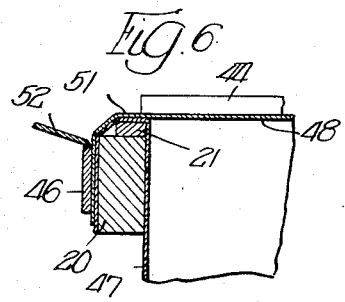
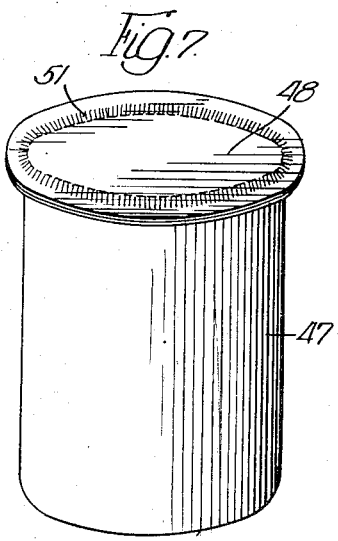
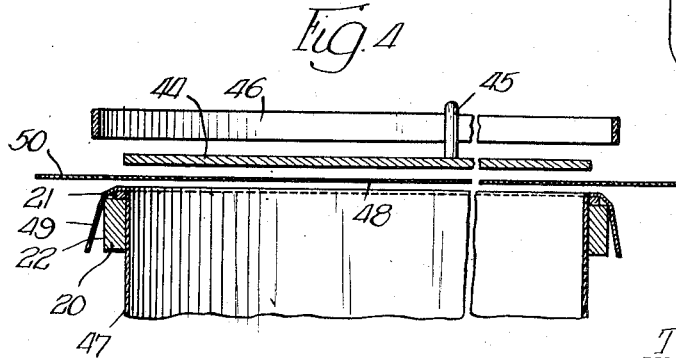
INVENTORS
Thomas R. Baxter,
BY Thomas A. Weisz,
Cromwell, Greist & Warden
ATTYS

United States Patent Office 2,758,522
Patented Aug. 14, 1956

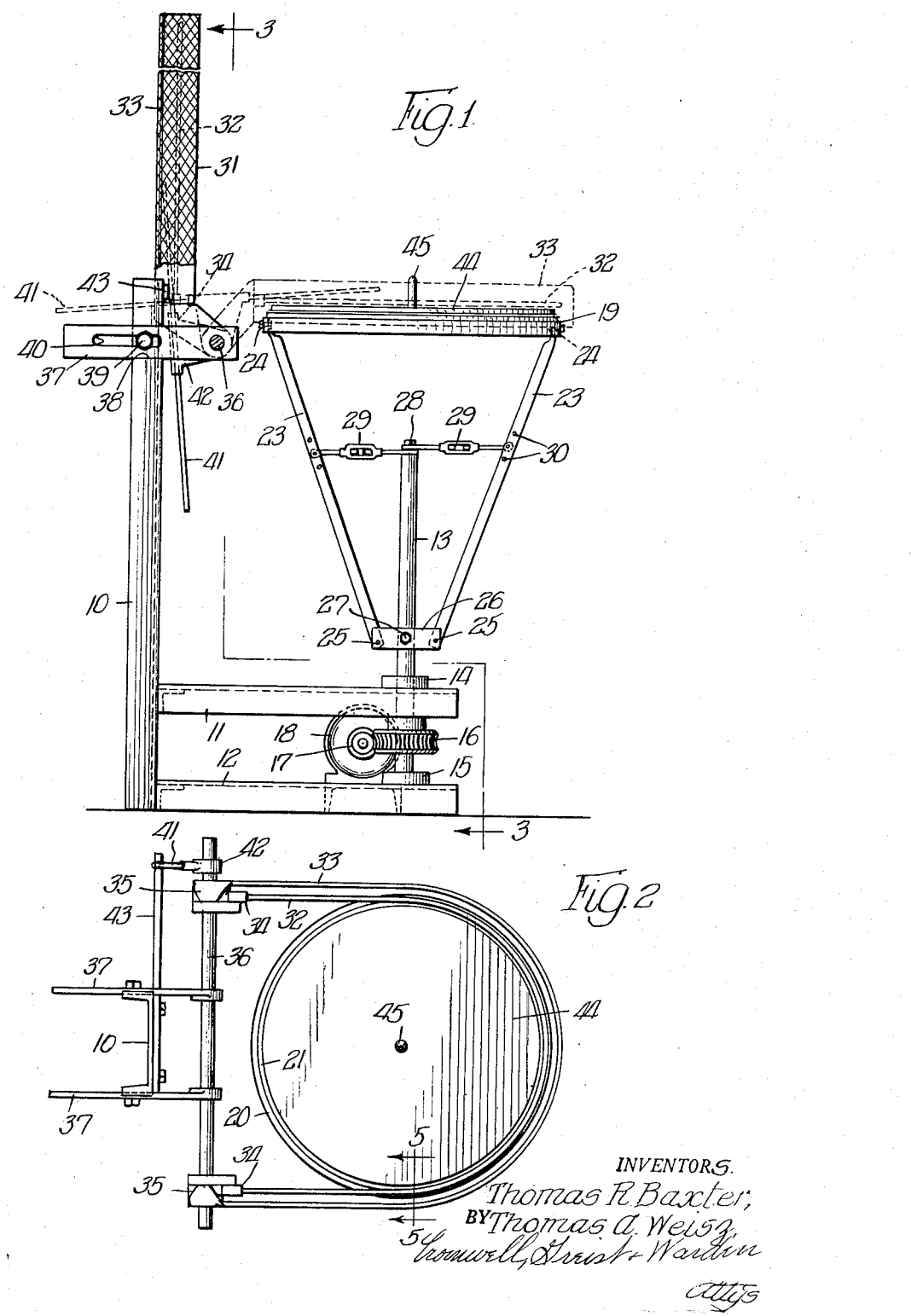

2,758,522

APPARATUS FOR FABRICATING DRUM LINERS

Thomas R. Baxter, Mount Vernon, Ohio, and Thomas A. Weisz, Sao Paulo, Brazil, assignors, by mesne assignments, to Continental Can Company, Inc., New York, N. Y., a corporation of New York Application December 31, 1952, Serial No. 329,052

5 Claims. (Cl. 93—55.1)

This invention is concerned with the fabrication of containers and is more particularly concerned with the formation of a liner of heat sealable film material for a container of drum-like shape.

It is a general object of the invention to provide a method and apparatus for attaching an end closure sheet to the marginal portions of a tubular section of transparent film material to form therewith a liner for a drum type container.

It is a more specific object of the invention to provide a method of forming, from heat sealable flexible film material, a drum liner, which comprises positioning an end of a tubular section of the material in a circular supporting ring member with the marginal portion of the tubular section arranged in reversely bent relation outwardly of the top and vertical edges of the ring member, positioning thereon an end closure forming sheet of the material with the marginal portions thereof in overlapping relation to the marginal portion of the tubular section, clamping the overlapped marginal portions of the material against the vertical outer wall of the ring member, positioning a metal clamping plate on the upper face of the ring member with the margins thereof spaced inwardly of the outer edge of the ring member and subjecting the exposed marginal portions of the material to a radiant heating element while simultaneously rotating the ring member about its vertical axis.

Another object of the invention is to provide apparatus for use in fabricating a round bottom drum liner from heat sealable film material which comprises a supporting ring of heat resistant material mounted on a standard for rotation about its vertical axis, which supporting ring is adapted to receive a tubular section of the film material with the marginal portions arranged in outwardly bent relation over the top and outer faces of the supporting ring and to receive an end closure member of the film material with the marginal portions arranged in overlapping relation to the marginal portions of the tubular section, a clamping band adapted to be positioned around the outer periphery of the supporting ring to clamp the overlapping portions of the liner forming material thereagainst, a top clamping plate adapted to be positioned on the top surface of the supporting ring with the peripheral edge thereof spaced inwardly of the outer edge of the supporting ring, and a swingably mounted semi-circular radiant heating element adapted to be moved to a position adjacent to the outer edges of the top clamping plate whereby, when the tubular section and end closure members are arranged on the ring and the clamping members are positioned thereon, the ring may be rotated to carry the overlapped marginal portions of the liner material which are held in close surface contacting relation by the clamping members beneath the semi-circular heating element and form therein a closure seam.

It is another object of the invention to provide apparatus for use in the fabrication of a drum liner which comprises a supporting stand, an upstanding shaft mounted in rotatable relation thereon, a supporting ring arranged at the upper end of said shaft, which ring is of relatively small generally rectangular cross section presenting a top horizontal surface and a vertical peripheral outer surface whereby to support one end of a tubular section of film material with the margins thereof arranged in reversely positioned relation over the top and outer surfaces thereof, the ring also being adapted to support an end closure forming member of the material with the margins draped downwardly around the outer periphery of the ring in overlapping relation to the margins of the tubular section, a clamping band adapted to be positioned around the vertical outer edge of the supporting ring to clamp the liner forming material against the same, a top clamp plate of circular shape adapted to be positioned on the top surface of the supporting ring with the peripheral edge thereof spaced inwardly of the outer edge of the supporting ring, and a radiant heat sealing member of semi-circular shape pivotally mounted on the supporting stand and adapted to swing into a horizontal position adjacent the outer edge of the material supporting ring whereby the ring may be rotated and a satisfactory heat seal formed in the overlapped margins of the tubular section and end closure member.

These and other objects and advantages of the invention will be apparent from a consideration of the detailed method which is disclosed herewith and the specific apparatus for carrying out the method which is shown by way of example in the accompanying drawings, wherein:

Fig. 1 is a side elevation of apparatus suitable for carrying out the herein described method which embodies the principal features of the invention, the radiant heat sealing mechanism being shown in full line in the retracted position with the seal forming position being indicated in dotted line;

Fig. 2 is a plan view of the apparatus with the radiant heat sealing mechanism in heat sealing position;

Fig. 3 is a sectional view taken generally on the line 3—3 of Fig. 1;

Fig. 4 is an exploded view of the supporting and clamping members, with the liner members in the relative position in which they are assembled for the sealing operation, the members being shown in vertical section and with portions broken away;

Fig. 5 is a partial section, to an enlarged scale, taken generally on the line 5—5 of Fig. 2;

Fig. 6 is a partial section similar to Fig. 5 illustrating the complete seal and the method of trimming off the excess material from the margins thereof; and Fig. 7 is a perspective view of a completed drum liner, with the bottom being shown uppermost.

Referring to the drawings there is illustrated a method of fabricating an inner, round bottom liner for a drum type container and apparatus for carrying out the steps of the same, which embodies the principal features of the invention. The apparatus is particularly adapted to be used with film material having the heat sealing characteristics of polyethylene.

The apparatus is mounted on a supporting frame which comprises an upright member 10, preferably of channel section, and two vertically spaced forwardly extending base members 11 and 12 which form the base support for the frame. A vertical shaft 13 extends upwardly at the forward end of the base support members 11 and 12 which is mounted for rotation in bearings 14 and 15, the latter being mounted in the respective base members 11 and 12. A gear 16 is mounted on the shaft 13 which is in driving relation with a worm 17 on the power shaft of a motor 18, the latter being supported at the base of the frame. A speed reduction device (not shown) may be used, if required, to obtain the desired speed of rotation of shaft 13.

In spaced relation above the top of the shaft 13 there is arranged a supporting ring structure 19 which comprises a base ring 20 and a top ring 21, the two ring members having essentially the same internal diameter and being of somewhat different thickness. The ring member 20 which is preferably formed of fiber is larger in external diameter than the ring member 21 and has a vertical face 22 extending around the periphery thereof in outwardly spaced relation to the external edge of the ring 21. The ring 21 is formed of heat insulating material, preferably, silicon rubber.

The ring structure 19 is attached to the vertical shaft 13 by means of upright struts or support members 23 which are attached to the ring formation 19 by bolts 24 and pivotally secured at 25 to a base block 26. The base block 26 is apertured to receive the vertical shaft 13 and is adjustably secured on the shaft 13 by a set screw 27 or the like, immediately above the bearing 14. Each of the vertical support members 23 is adjustably connected to the pin 28 on the top of the post 13 by means of an axially extensible bolt 29 which is connected at one end to the pin 28 and at the other end in any one of the spaced apertures 30 on the support member 23. With this arrangement different size ring formations 19 may be supplied and interchangeably supported on the shaft 13.

The base upright 10 of the frame structure supports at its top end a radiant heating device 31. The radiant heating device 31 comprises a semi-circular or C-shaped heating element 32 and a guard member 33 of the same shape which extends around the outer periphery of the heating element 32. The legs of the heating element 32 are attached at 34 to the upper face of brackets 35 which are secured on a cross shaft 36 journaled in a pair of forwardly extending brackets 37. The brackets 37 are slidable in guideways 38 formed in the side faces of the upright 10 near the upper end thereof and are secured in adjusted relation therein by bolts 39 which are received in slots 40 in the brackets. The guard 33 is likewise attached at its ends to the upstanding faces of the brackets 35 so that rotative movement of the shaft 36 moves the heating device 31 into and out of operative position. The shaft 36 is provided at one end with a handle 41 for manually turning the same to properly position the heating device 31 adjacent the ring support 19. The handle 41 is mounted on the shaft 36 by means of a bracket 42 and is generally parallel with the heating element 32. A stop bar 43 is secured on the upright 10 in position to limit the movement of the sealing device 31 so that it is positioned properly for the sealing operation or in a retracted, out of use position (Fig. 1).

The apparatus also includes a top clamping plate 44 which is generally circular with its outer periphery of the somewhat less diameter than the outer periphery of the ring member 21 so that when centered on the upper face of the ring member 21 the edges of the plate 44 are spaced inwardly of the outer edges of the ring member 21. The plate 44 is preferably provided with a handle 45 to facilitate its use by the operator.

A material clamping ring or band 46 (Figs. 4 to 6) is also provided which is adapted to be slipped down over the outer periphery of the supporting ring member 20 after the fashion of an embroidery hoop for securing the margins of the tube section 47 and the bottom forming sheet 48 in clamped position on the ring formation 19 when they are positioned thereon for sealing.

In using the apparatus for fabricating the liner the operator first places a section 47 of tubular material, which is designed to form the body or side walls of the liner, within the ring formation 19 and thereafter folds the marginal edges 49 outwardly and downwardly around the ring members 20 and 21 as shown in Fig. 4, the depending portion of the tubular section 47 being accommodated in partially collapsed condition in the space immediately beneath the ring member 20 (Fig. 1). A bottom or end closure forming sheet 48 of the material is then positioned over the ring support 19 with the marginal edges 50 draped down over the outside edges of the ring formation 19 in overlapping relation with the marginal edges 49 of the tube section 47. The clamping ring or band 46 is then positioned in engagement with the overlapping portions of the material to clamp the same against the peripheral surface 22 of the ring member 20. When the band 46 is in clamping position the margins 49 and 50 of the material may be pulled down or straightened against the peripheral surface 22 of the band member 20 to insure that the overlapping surfaces are smooth and unwrinkled. The top clamping plate 44 is then positioned on the sheet 48 with the plate centered so that the marginal edges thereof are spaced inwardly of the marginal edges of the ring member 21. The radiant heat sealing device 31 is then positioned as shown in dotted line in Fig. 1 to bring the heating element 32 into the position shown in Fig. 5, by manual operation or rotation of the shaft 36. Movement of the heating device 31 into position around the supporting ring formation 19 places the heating element 32 in close proximity to the top ring member 21. Simultaneously with the movement of the heating device 31 into operative or sealing position the shaft 13 is rotated by the motor 18 to rotate the supporting ring 19 and move the exposed and overlapped margins 49 and 50 of the tube section 47 and the end closure sheet 48 beneath the heating element 32 for a sufficient length of time to fuse the material by radiant heat and form a seam of substantial width, therein. Thereafter the heating device 31 is moved away from the ring support 19 by manipulation of handle 41 and the marginal edges or portions 49 and 50 of the tube section 47 and the end closure 48 are trimmed by means of a suitable knife, indicated at 52 in Fig. 6 the blade of which is placed against the outer surface 22 of the ring member 20 immediately above the clamping band 46. Removal of the plate 44 then permits the completed drum line to be removed from the apparatus. The seam 51 formed between the overlapped margins 49 and 50 of the material is uniform and of substantial width as a result of the material in the seam forming area being held in close surface engagement during the sealing operation. The material in the seam area 51 is a full double thickness since there is no stretching or thinning out of the material in the seam forming area.

The detailed method steps described herewith and the specific mechanism illustrated for carrying out the same represent the present preferred form of the invention but it will be understood that variations in the method steps and the apparatus are contemplated within the spirit of the invention.

We claim:

1. Apparatus for use in sealing a closure sheet of heat sealable material to an end of a tube section of similar material, said apparatus comprising a supporting stand, a rotatable spindle extending upwardly of said stand, a supporting ring of relatively small generally rectangular cross section mounted in said spindle and adapted to receive in reversely bent relation thereon the marginal portions of said tube section, said ring being adapted to receive on its upper surface said closure sheet with marginal portions thereof overlying the marginal portions of said tube section, a circular clamping band for clamping the margins of said sheet and said section against the outer periphery of said supporting ring, a circular metal disc adapted to be positioned on said supporting ring with the peripheral margins spaced inwardly of said ring and a radiant heating element swingably mounted on said stand for positioning adjacent the margins of said ring to form a seam in the overlapping portions of said tube section and said closure sheet.

2. Apparatus for use in sealing a closure sheet of heat sealable material to an end of a tube section of similar material, said apparatus comprising a supporting stand, a rotatable spindle extending upwardly of said stand, a supporting ring of relatively small rectangular cross section mounted on said spindle, a heat insulating ring of smaller external diameter mounted on said supporting ring, and adapted to receive in reversely bent relation thereover the marginal portions of said tube section, said insulating ring being adapted to receive on its upper surface a closure sheet with the margins thereof overlying the marginal portion of said tube section, means for clamping the margins of said sheet and said tube section against the outer periphery of said supporting ring, a circular disk adapted to be positioned on said supporting ring with the peripheral margins spaced inwardly of the periphery of said insulating ring and a radiant heating element mounted on said stand for positioning adjacent the margin of said supporting ring to form a seam in the overlapped portions of said tube section and said closure sheet.

3. Apparatus for use in sealing a closure sheet of heat sealable material to an end of a tube section of similar material, said apparatus comprising a supporting stand, a rotatable shaft projecting upwardly of said stand, a supporting ring of relatively small generally rectangular cross section mounted on said shaft and adapted to receive in reversely bent relation thereon the marginal portion of said tube section, said ring having an upper surface adapted to receive said closure sheet with marginal portions thereof overlying the marginal portions of said tube section, a clamping member for clamping the margins of said sheet and said section against the outer periphery of said supporting ring, a radiant heating element mounted on the stand and adapted to be moved to a position in close proximity to the overlapped margins of said tube section and said closure sheet, and means for rotating said shaft to carry the overlapped marginal portions of said tube section and said closure sheet beneath the radiant heating element and forming therein a seam.

4. Apparatus for use in sealing a closure sheet of heat sealable material to an end of a tube section of similar material, said apparatus comprising an upright frame, a vertically extending spindle mounted adjacent said frame, a ring supporting member mounted on said spindle and having a relatively small generally rectangular cross section, said ring member being adapted to receive said tubular section with the margins thereof folded outwardly around the top and vertical edges of said ring member, said ring member being adapted to receive said closure sheet with its margin extending down over the outer periphery thereof, a heat resisting circular member adapted to be supported on the top of said ring member with its outer periphery extending inwardly of the outer periphery of said ring member, a semi-circular radiant heating element swingably mounted on the stand and adapted to be positioned in close proximity to the margins of said ring member, and means to rotate the vertical shaft to form a seam in the overlapped portions of said tube section and said closure sheet.

5. Apparatus for use in sealing a closure sheet of heat sealable material to an end of a tube section of similar material, said apparatus comprising an upright frame, a vertically extending spindle mounted adjacent said frame, a ring member supported above the top of said spindle and having a relatively small generally rectangular cross section, said ring member being adapted to receive said tubular section with marginal portions thereof folded outwardly and downwardly around the top and outer vertical edges of said ring member, said ring member being adapted to also receive said closure sheet with the marginal portions thereof extending over the top edge and down over the outer peripheral edge thereof in contact with the marginal portions of said tubular section, a band clamp for securing the overlapped marginal portions of the tube section and the closure sheet in clamped relation against the peripheral edge of said ring member, a heat resisting circular member adapted to be supported on the top edge of said ring member with its outer periphery extending inwardly of the outer periphery of said ring member, a semi-circular radiant heating element swingably mounted on the stand and movable to a position in spaced relation to the top edge of said ring member, and means to rotate the vertical shaft to move the exposed marginal portions of the tube section and the closure sheet relative to the radiant heating element whereby to form a seam therein.

References Cited in the file of this patent
UNITED STATES PATENTS

| 1,155,734 | Janisch | Oct. 5, 1915 |
| 1,376,499 | Anderson | May 3, 1921 |
| 2,012,529 | Eldredge | Aug. 27, 1935 |
| 2,244,282 | Bergstein | June 3, 1935 |
| 2,293,142 | Johnson | Aug. 18, 1942 |